United States Patent
Felch et al.

(10) Patent No.: US 8,114,297 B2
(45) Date of Patent: Feb. 14, 2012

(54) WET OXIDATION OF SOOT

(75) Inventors: Chad L. Felch, Mosinee, WI (US);
Bruce Brandenburg, Wausau, WI (US);
Philip Rettger, Moraga, CA (US);
Bryan Kumfer, Wausau, WI (US);
Curtis Cooley, Wausau, WI (US);
Timothy Schleusner, Mosinee, WI (US); Mark Clark, Wausau, WI (US)

(73) Assignee: Siemens Industry, Inc., Alpharetta, GA (US)

( * ) Notice: Subject to any disclaimer, the term of this patent is extended or adjusted under 35 U.S.C. 154(b) by 1145 days.

(21) Appl. No.: 11/542,676

(22) Filed: Oct. 3, 2006

(65) Prior Publication Data
US 2008/0078724 A1    Apr. 3, 2008

Related U.S. Application Data

(63) Continuation-in-part of application No. 11/542,675, filed on Oct. 3, 2006.

(51) Int. Cl.
*C02F 1/00* (2006.01)
*G08B 21/00* (2006.01)
(52) U.S. Cl. ............ 210/739; 210/167.3; 210/749; 210/96.1; 422/22; 422/116; 422/3; 422/108
(58) Field of Classification Search ............ 210/50, 210/758, 762, 760, 739, 167.3, 96.1; 252/373; 422/22, 116, 3, 108
See application file for complete search history.

(56) References Cited

U.S. PATENT DOCUMENTS

| | | | |
|---|---|---|---|
| 3,607,925 A * | 9/1971 | Boichard et al. | 562/548 |
| 3,912,626 A * | 10/1975 | Ely et al. | 210/710 |
| 4,234,423 A * | 11/1980 | Moore et al. | 210/758 |
| 4,265,747 A | 5/1981 | Copa et al. | |
| 4,294,720 A * | 10/1981 | Visser et al. | 252/373 |
| 4,626,354 A | 12/1986 | Hoffman et al. | |
| 4,749,492 A | 6/1988 | Berrigan, Jr. et al. | |
| 4,778,598 A | 10/1988 | Hoffman et al. | |
| 4,810,386 A | 3/1989 | Copa et al. | |
| 4,897,196 A | 1/1990 | Copa et al. | |
| 5,082,571 A | 1/1992 | Beula et al. | |
| 5,240,619 A | 8/1993 | Copa et al. | |
| 5,244,576 A | 9/1993 | DeRoeck et al. | |
| 5,268,104 A | 12/1993 | Masoomain | |
| 5,298,174 A | 3/1994 | Momont et al. | |
| 5,368,726 A | 11/1994 | Masoomian | |
| 5,620,606 A | 4/1997 | McBrayer et al. | |

(Continued)

FOREIGN PATENT DOCUMENTS

EP    0368834 A1    1/1993
(Continued)

OTHER PUBLICATIONS

Dutch Written Opinion and Standard Search Report dated Sep. 29, 2009 for Dutch Application No. 2008974.

*Primary Examiner* — Walter D Griffin
*Assistant Examiner* — Cameron J Allen

(57) ABSTRACT

A system and method for the treatment of soot containing an insoluble metal. The soot is formed into a soot slurry and a characteristic of the soot slurry is maintained to solubilize at least a portion of the metal to act as a catalyst. The soot slurry with the soluble metal is wet oxidized.

8 Claims, 4 Drawing Sheets

U.S. PATENT DOCUMENTS

| | | | |
|---|---|---|---|
| 5,641,413 A | 6/1997 | Momont et al. | |
| 5,720,889 A * | 2/1998 | McBrayer et al. | 210/739 |
| 5,885,422 A | 3/1999 | Kurukchi et al. | |
| 5,891,346 A | 4/1999 | Huntley | |
| 6,110,385 A | 8/2000 | Copa et al. | |
| 6,210,583 B1 | 4/2001 | Kurukchi et al. | |
| 6,444,130 B1 | 9/2002 | Manganaro et al. | |
| 7,172,701 B2 | 2/2007 | Gaid et al. | |
| 2005/0171390 A1 | 8/2005 | Felch et al. | |
| 2006/0060541 A1 | 3/2006 | Abazajian | |

FOREIGN PATENT DOCUMENTS

| | | |
|---|---|---|
| EP | 1647529 A1 | 4/2006 |
| JP | 61-257291 | 5/1985 |
| WO | 2006010218 | 2/2006 |

* cited by examiner

WET OXIDATION OF SOOT

RELATED APPLICATIONS

This application is a continuation-in-part of U.S. patent application Ser. No. 11/542,675 to Felch et al. entitled CATALYTIC WET OXIDATION SYSTEMS AND METHODS, filed on Oct. 3, 2006, which is incorporated herein by reference in its entirety for all purposes.

BACKGROUND OF INVENTION

1. Field of Invention

The present invention relates to a wet oxidation system and process, and more particularly, to a subcritical wet oxidation system and process for the treatment of soot.

2. Background Art

Combustion of fossil fuels typically results in the formation of soot as a byproduct. The preparation of synthesis gas (a mixture of carbon monoxide and hydrogen) typically relies on the partial combustion of hydrocarbons which results in the formation of about 1 weight percent to about 2 weight percent soot. Soot present in the synthesis gas is generally separated by quenching and subsequent scrubbing to produce a soot-containing slurry or liquor. The resultant soot slurry may be further separated from the liquid for disposal.

SUMMARY OF INVENTION

In accordance with one or more embodiments, the invention relates to a wet oxidation process. The process may comprise providing an aqueous slurry comprising a volatile organic carbon and a metal. The process may detect a pH level of the aqueous slurry and maintain the pH level of the aqueous slurry at a predetermined level to solubilize at least apportion of the metal. The slurry may be oxidized at a subcritical temperature and a superatmospheric pressure in the presence of the metal to substantially destroy the volatile organic carbon.

In accordance with one or more embodiments, the invention relates to a process for the destruction of volatile organic carbon present in a slurry. The process may comprise providing a slurry comprising volatile organic carbon and a transition metal. The process may solubilize at least a portion of the transition metal to generate a homogeneous catalyst and oxidize the slurry at a subcritical temperature and a superatmospheric pressure in the presence of the homogeneous catalyst to produce an effluent having a reduced volatile organic carbon content.

In accordance with one or more embodiments, the invention relates to a wet oxidation system. The wet oxidation system may comprise a wet oxidation unit, a source of an aqueous slurry comprising volatile organic carbon and a solubilizable transition metal fluidly connected to the wet oxidation unit. The system may have a pH sensor configured to detect a pH level of the aqueous slurry and a source of a pH adjuster fluidly connected to at least one of the wet oxidation unit and the source of the aqueous slurry.

In accordance with one or more embodiments, the invention relates to a gasification system. The system may comprise a source of hydrocarbon feedstock and a gasification reactor to produce a synthesis gas fluidly connected to the source of the feedstock. The system may also comprise a separator fluidly connected to the gasification unit and a wet oxidation unit containing an aqueous slurry fluidly connected to the separator. The system may comprise a pH sensor configured to detect a pH of the aqueous slurry and a source of pH adjuster fluidly connected to at least one of the wet oxidation unit and a source of the aqueous slurry.

Other advantages, novel features and objects of the invention will become apparent from the following detailed description of the invention when considered in conjunction with the accompanying drawings.

BRIEF DESCRIPTION OF DRAWINGS

The accompanying drawings are not intended to be drawn to scale. In the drawings, each identical, or substantially similar component is represented by a single numeral or notation. For purposed of clarity, not every component is labeled in every figure, nor is every component of each embodiment of the invention shown where illustration is not necessary to allow those of ordinary skill in the art to understand the invention. Preferred, non-limiting embodiments of the present invention will be described by way of example and with reference to the accompanying drawings, in which.

DETAILED DESCRIPTION

The present invention relates to the catalytic wet oxidation of a waste stream containing soot. As used herein, the term "soot" is defined as particulates of volatile organic carbon and carbon black, typically generated during the incomplete combustion of hydrocarbons. Depending upon the combustion fuel source, typically a hydrocarbon feedstock, one or more metals may be present in the soot. Wet oxidation is a well-known technology for the destruction of pollutants in wastewater involving the treatment of the waste stream with an oxidant, generally molecular oxygen from an oxygen-containing gas, at elevated temperatures and pressures. Wet oxidation at temperatures below the critical temperature of water, 374° C., is termed subcritical wet oxidation. Subcritical wet oxidation systems operate at sufficient pressure to maintain a liquid water phase and may be used commercially for conditioning sewage sludge, the oxidation of caustic sulfide wastes, regeneration of powdered activated carbon, and the oxidation of chemical production wastewaters, to name only a few applications.

In one embodiment of the invention, soot from any combustion fuel source may be separated from a gaseous stream and may be wet oxidized at a temperature and pressure sufficient to substantially destroy any volatile organic carbons present in the soot. As used herein, the phrase "substantially destroy is defined as at least about 90% destruction. Examples of combustion fuel sources include, but are not limited to coal, fossil fuels (oil, natural gas, and bitumen), biomass and solid waste. The volatile organic carbon component of soot may be any of the naturally occurring hydrocarbons in fossil fuels typically consisting of n-alkanes between $C_{10}$ and $C_{33}$ chain length and polycyclic aromatic hydrocarbons, such a naphthalene. In one embodiment, soot produced during processing bitumen may be wet oxidized.

Soot present in a gaseous stream may be separated from the gaseous stream by conventional methods, such as with a direct water spray, a scrubber such as a packed bed, and combinations thereof. The separation of soot from a gas by conventional methods typically results in the formation of an aqueous soot slurry, which may contain up to about 20 g/l of soot. The soot slurry may be further dewatered by conventional means to form a filter cake which may be disposed of as hazardous waste.

Figure 1:
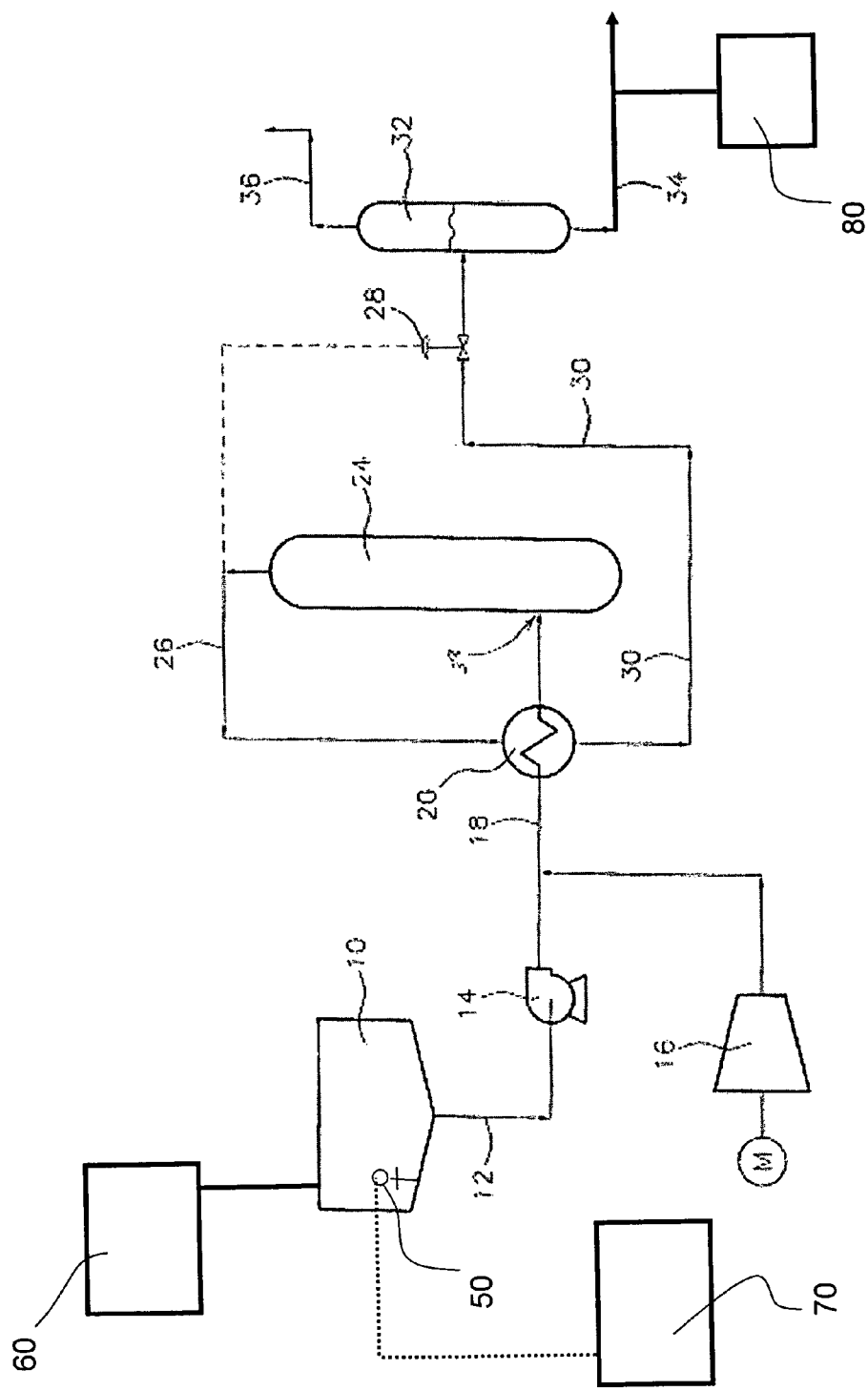
FIG. 1 is a system diagram in accordance with one embodiment of the wet oxidation system of the present invention.

Wet oxidation of a hydrocarbon byproduct or soot slurry may be performed in any known batch or continuous wet oxidation unit suitable for the compounds to be oxidized. For example the wet oxidation unit may be made of steel, nickel, chromium, titanium, and combinations thereof. In one embodiment, aqueous phase oxidation is performed in a continuous flow wet oxidation system, as shown in FIG. 1. Any oxidant may be used. Preferably, the oxidant is an oxygen-containing gas, such as air, oxygen-enriched air, essentially pure oxygen or ozone. As used herein, the phrase "oxygen-enriched air" is defined as air having an oxygen content greater than about 21%. Wet oxidation of the volatile organic carbon in the soot produces carbon dioxide and water, thereby reducing the solid content of the soot.

Referring to FIG. 1, an aqueous soot slurry from a source, shown as storage tank 10 flows through a conduit 12 to a high pressure pump 14 which pressurizes the aqueous mixture. The source of the soot slurry may be an effluent from any upstream process fluidly connected to a wet oxidation unit. Alternatively, the soot slurry may be formed from a soot cake combined with a fluid, such as water, to from a soot slurry for wet oxidation.

The soot slurry is mixed with a pressurized oxygen-containing gas, supplied by a compressor 16, within a conduit 18. The soot slurry flows through an optional heat exchanger 20 where it may be heated to a temperature which initiates oxidation. In some embodiments, the wet oxidation unit may be fluidly connected to an upstream effluent which is at a sufficient temperature to initiate oxidation without the addition of heat. The heated soot slurry then enters a reactor vessel 24 at inlet 38. Reactor vessel 24 provides a residence time wherein the bulk of the oxidation reaction occurs. The oxidized soot slurry and oxygen depleted gas mixture then exit the reactor through a conduit 26 controlled by a pressure control valve 28. The hot oxidized effluent traverses the heat exchanger 20 where it is cooled against incoming soot slurry feed and gas mixture. The cooled effluent mixture flows through a conduit 30 to a separator vessel 32 where the oxidized soot slurry and gases are separated. The oxidized soot slurry exits the separator vessel 32 through a lower conduit 34 while the gases are vented through an upper conduit 36.

In one embodiment, the wet oxidation process may be operated at a temperature below 374° C., the critical temperature of water. In one embodiment, the wet oxidation process may be operated at a temperature between about 150° C. and about 373° C. In another embodiment, the wet oxidation process may be operated at a temperature between about 150° C. and about 320° C. The retention time for the soot slurry at the selected oxidation temperature is at least about 15 minutes and up to about 6 hours. In one embodiment, the soot slurry is oxidized for about 15 minutes to about 4 hours. In another embodiment, the soot slurry is oxidized for about 30 minutes to about 3 hours.

Sufficient oxygen-containing gas is supplied to the system to maintain an oxygen residual in the wet oxidation system off gas, and the gas pressure is sufficient to maintain water in the liquid phase at the selected oxidation temperature. For example, the minimum pressure at 240° C. is 33 atmospheres, the minimum pressure at 280° C. is 64 atmospheres, and the minimum pressure at 373° C. is 215 atmospheres. In one embodiment, the soot slurry is oxidized at a pressure of about 10 atmospheres to about 275 atmospheres. In another embodiment, the soot slurry is oxidized at a pressure of about 10 atmospheres to about 217 atmospheres.

In one embodiment, a catalyst may be added to the soot slurry feed stream and/or may be directly added to the wet oxidation unit. An effective amount of catalyst may be generally sufficient to increase reaction rates and/or improve the overall destruction removal efficiency of the system, including enhanced reduction of chemical oxygen demand (COD). The catalyst may also serve to lower the overall energy requirements of the wet oxidation system.

In at least one embodiment, the catalyst may be any homogeneous (soluble) catalyst. In one embodiment, the catalyst may be any transition metal in Groups III through XII. In another embodiment, the transition metal may be V, Cr, Mn, Fe, Co, Ni, Cu, Zn, Mo, Ag, and combinations thereof. The transition metal may be elemental and/or in a compound, such as a metal salt. In one embodiment, the transition metal is vanadium. In another embodiment, the transition metal catalyst is nickel.

Alternatively to adding a catalyst to the wet oxidation system, a catalyst may be naturally present in the soot. For example, soot produced from processing bitumen may include any naturally occurring minerals and metals at varying concentrations depending upon the geographic location of the bitumen deposit. Soot from bitumen may contain any or all of silver, aluminum, arsenic, barium, beryllium, calcium, cadmium, cobalt, chromium, copper, iron, mercury, potassium, magnesium, manganese, molybdenum, sodium, nickel, lead, antimony, selenium, silicon, strontium, titanium, vanadium, zinc, zirconium, and phosphorous in addition to the carbon black and volatile organic carbons.

In instances in which the combustion fuel source contains one or more transition metals, the one or more transition metals may become concentrated with the soot during combustion and may remain with the resultant soot slurry in an insoluble form. In general, characteristics of the soot slurry may impact the solubility of a catalyst in the soot slurry. For example, a pH level of the aqueous mixture to be treated may affect the solubility of a particular catalyst in the soot slurry.

In one embodiment, all or a portion of the insoluble transition metals may solubilzed before or during wet oxidation. For example, the insoluble form of the transition metal may be oxidized into a more soluble form during wet oxidation, thereby becoming available to act as a catalyst. Alternatively, a characteristic of the soot slurry, such as temperature and/or pH may be adjusted prior to or during wet oxidation to increase the solubility of the transition metal, causing all or a portion of the transition metal to become available to act as a catalyst during the wet oxidation process.

A source of an acid and/or a source of a base may be used to adjust the pH of the slurry as desired. In one embodiment, the pH of the soot slurry is increased to increase the solubility of a transition metal naturally present in the soot. In another embodiment, the pH of the soot slurry may be decreased to increase the solubility of the transition metal. The wet oxidized soot slurry may contain a metal content further concentrated by the removal of the volatile organic carbon. The solids may be removed from the oxidized soot slurry by conventional processes. If desired, the pH of the soot slurry may be adjusted to reduce the solubility of the metal prior to separating water from the oxidized slurry.

Figure 3:
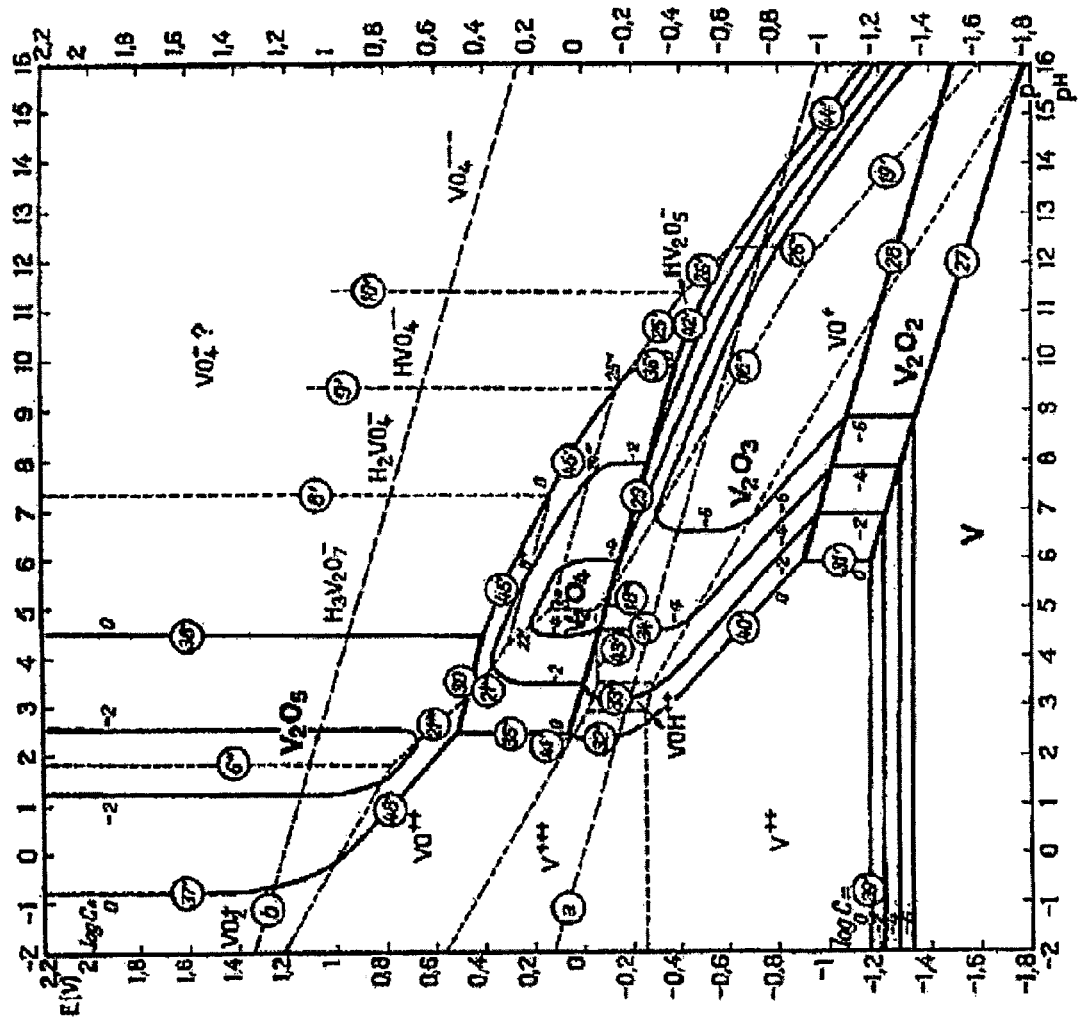
Figure 4:
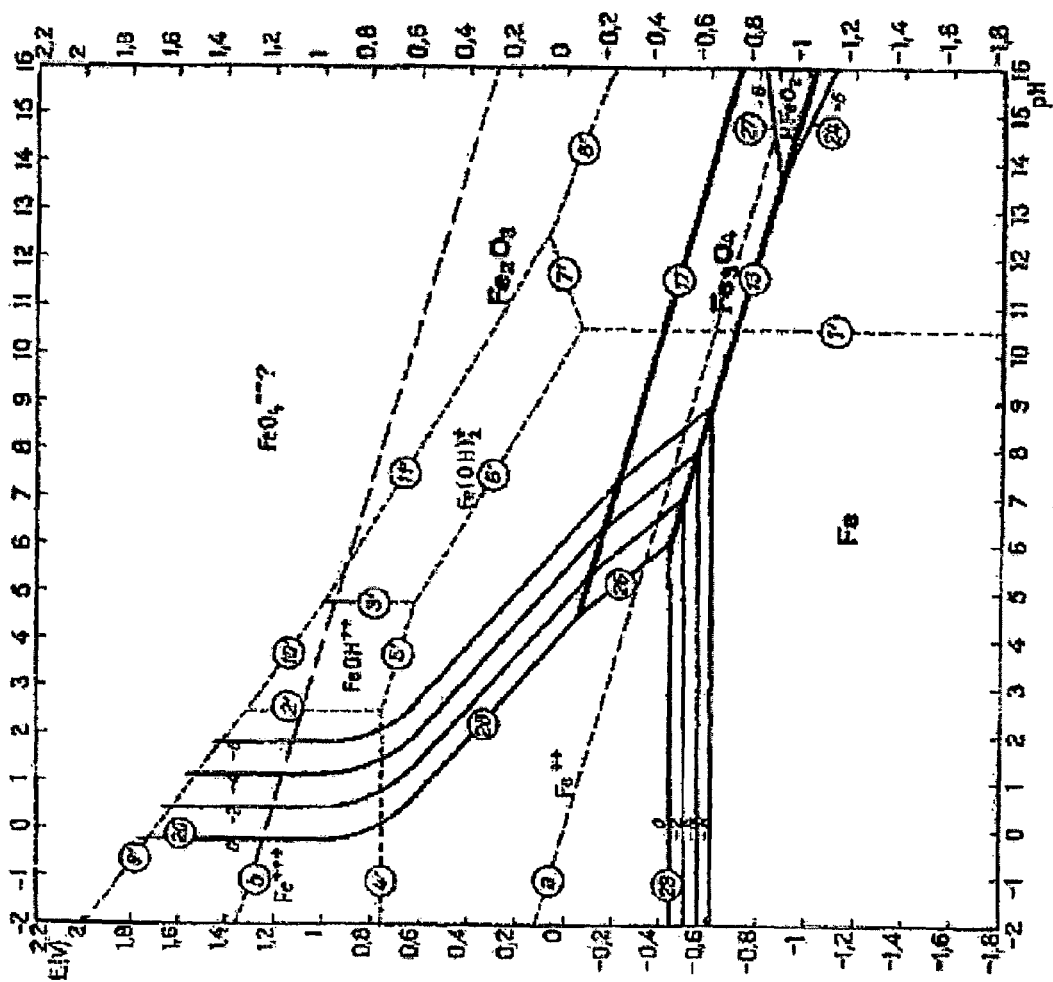

The relationship between solubility and pH level for various catalysts is generally known by those skilled in the art. Potential-pH equilibrium diagrams have been constructed for various catalyst-water systems and are readily available to those skilled in the art familiar with how to reference them. For example, reproductions of what are commonly referred to as Pourbaix diagrams available from Pourbaix, M. M., *The Atlas of Electrochemical Equilibria in Aqueous Solutions*, National Association of Corrosion Engineers: Texas 1974, are presented in FIGS. 2-4 for copper, vanadium and iron, respectively.

Figure 2:
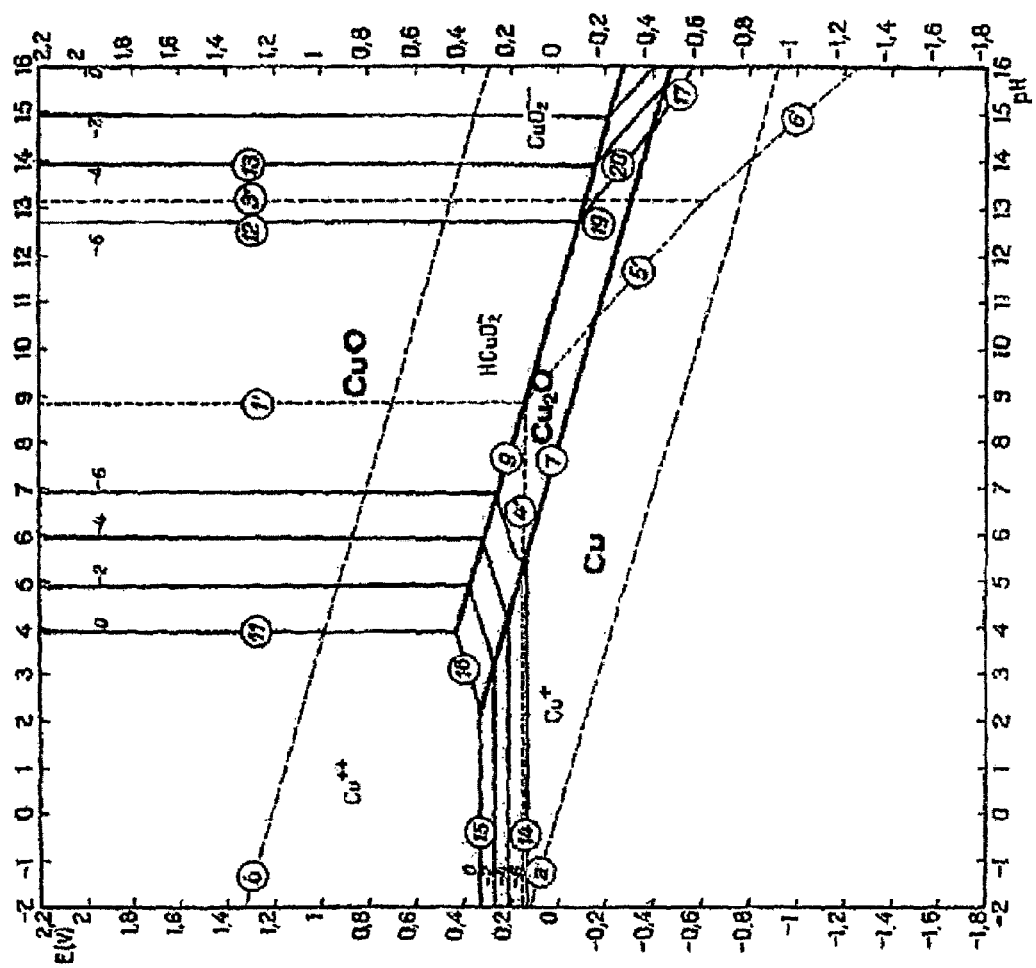
FIGS. 2-4 are Pourbaix diagrams referenced herein for copper, vanadium and iron, respectively.

Pourbaix diagrams may provide information for determining a desired pH range in which a selected insoluble catalyst present in the soot would be soluble. With reference to FIG. 2, the pH level of the slurry may be adjusted to below about 2 or above about 13 when the selected catalyst comprises copper. Likewise, with reference to FIG. 3, the pH level of the soot slurry may be adjusted to above about 4.5 when the selected catalyst comprises vanadium. When a catalyst comprising iron is selected, the pH level of the soot slurry may be adjusted to a level below about 4 with reference to FIG. 4.

Optionally, the wet oxidation system may include a sensor 50, configured to detect a characteristic of the aqueous mixture to be treated. In some embodiments, sensor 50 may be a pH sensor configured to detect a pH level of the aqueous mixture, and a catalyst for the wet oxidation process may be selected based on a detected pH level of the aqueous mixture. Manual or automatic feedback from sensor 50 may be used to maintain the aqueous slurry at a predetermined pH level. As used herein, the term "maintain" is defined as to keep at a predetermined level. It is understood that to maintain a predetermined level may or may not require adjustment of a process parameter or slurry characteristic. In one embodiment, a detected pH level may be at a predetermined pH level or within a predetermined pH level range, so that adjustment of the aqueous slurry pH may not be necessary. In another embodiment, the detected pH level may be above or below the predetermined pH level or above or below the predetermined pH level range, so that it may be desirable to manually or automatically adjust the detected pH level to increase the solubility of the catalyst.

A pH adjuster may be added to the aqueous mixture at any point within the wet oxidation system but is preferably added such that the catalyst is soluble within the aqueous mixture during the oxidation reaction. In some embodiments, a source of pH adjuster 60 may be fluidly connected to the source of the aqueous mixture 10 as illustrated in FIG. 1. The source of pH adjuster 60 may generally include any material or compound capable of adjusting the pH level of the aqueous mixture to a desired value or range. For example, acids and bases such as alkali metal hydroxide, soda ash, ammonia, and combinations thereof may be utilized to adjust the pH level of the aqueous mixture.

In some embodiments, the wet oxidation system may include a controller 70 for adjusting or regulating at least one operating parameter of the system or a component of the system, such as, but not limited to, actuating valves and pumps. Controller 70 may be in electronic communication with sensor 50 as illustrated in FIG. 1. Controller 70 may be generally configured to generate a control signal to adjust the pH level of the aqueous mixture in response to the pH sensor 50 registering a pH level outside a predetermined pH solubility range for the selected catalyst. For example, controller 70 may provide a control signal to one or more valves associated with pH adjuster source 60 to add pH adjuster to aqueous mixture source 10.

The controller 70 is typically a microprocessor-based device, such as a programmable logic controller (PLC) or a distributed control system, that receives or sends input and output signals to and from components of the wet oxidation system. Communication networks may permit any sensor or signal-generating device to be located at a significant distance from the controller 70 or an associated computer system, while still providing data therebetween. Such communication mechanisms may be effected by utilizing any suitable technique including but not limited to those utilizing wireless protocols.

According to one or more embodiments, the wet oxidized soot effluent stream may be processed by a secondary treatment unit 80 connected downstream of the oxidation reactor vessel 24 to remove remaining undesirable constituents present and/or further concentrate the soot. In one embodiment, the secondary treatment unit 80 may be a filter press to remove residual water, thereby concentrating the soot into a filter cake. In one embodiment, the filter cake may have a solids content greater than about 15 weight percent. In another embodiment, the filter cake may have a solids content greater than about 25 weight percent. In yet another embodiment the filter cake produced from the oxidized soot may have a solids content of about 30 weight percent.

Providing a filter cake with an increased solids content, as compared to typical filter cakes having a maximum solids content of about 15 weight percent, allows for more economical recovery of any metals present in the soot cake. Because the soot cake may have a higher solids content, and therefore a higher metal content, it may be economical to transport the soot cake to an off site metal reclaimer. Providing a filter cake with an increased solids content may also reduce the amount of waste sent off site for disposal (incineration and/or landfill), in the event any metals are not to be recovered. Because the soot may comprise metals, many of which are deemed hazardous, the costs associated with disposal of the soot cake may be reduced by the reduced volume and/or weight of the soot cake.

Oxidation enhancers may also be added to the soot slurry to increase the destruction efficiency of the volatile solids. In one embodiment, a concentration of nitric acid may sufficient to increase destruction efficiency may be added to the soot slurry prior to or during wet oxidation.

In one embodiment, processing bitumen containing Vanadium, Nickel, and other metals to recover oil commonly includes upgrading and gasification processes during which a soot slurry is generated. The soot slurry may contain from about 2 to about 3.5 weight percent solids. In one embodiment, the soot slurry comprises about 3 weight percent to about 3.5 weight percent solids. The bitumen is upgraded producing a partially upgraded distillate and asphaltenes containing concentrated metals. The asphaltenes containing the concentrated metals are then gasified in the presence of oxygen to produce synthesis gas containing soot and concentrated metal ash, which is then cooled to produce high pressure steam. Any metals (heavy and alkaline-earth) are transformed during the gasification process into oxides, sulfide, and carbonates, which are only slightly soluble in water. As such, the metals, as metal ash, follow the soot, which is separated from the synthesis gas in a quench pipe, soot separator and a soot scrubber.

The soot slurry from the scrubber may be depressurized and directed to a filter press, which produces filter cakes with a solid content of about 11 weight percent to about 15 weight percent prior to wet oxidation. The synthesis gas leaving the soot scrubber has a reduced residual soot content. Alternatively, the soot slurry from the scrubber may be directly fed to a wet oxidation unit.

In embodiments in which filter cakes containing soot and metal ash are formed prior to wet oxidation, the filter cakes are mixed with water to produce a slurry of about 3 weight percent to about 3.5 weight percent solids for wet oxidation. Mixing of the soot filter cake and water may be a batch process, in-line mixing, and combinations thereof. In one embodiment, bitumen from the oil sands of Canada may contain about 2.5 ounces of $V_2O_5$ per barrel of bitumen, which may produce a filter cake having about 15 weight percent solids, and a dry basis composition of about 80 weight percent carbon, about 13 weight percent Vanadium, about 3 weight percent Ni, about 0.4 weight percent Molybdenum, and a balance of iron, silicon, and other inerts.

Bench Scale Wet Oxidation (Autoclave) Reactors

Bench scale wet oxidation tests were performed in laboratory autoclaves. The autoclaves differ from the full scale system in that they are batch reactors, where the full scale unit may be a continuous flow reactor. The autoclaves typically operate at a higher pressure than the full scale unit, as a high charge of air must be added to the autoclave in order to provide sufficient oxygen for the duration of the reaction. The results of the autoclave tests provide an indication of the performance of the wet oxidation technology and are useful for screening operating conditions for the wet oxidation process.

The autoclaves used were fabricated from titanium, alloy 600 and Nickel 200. The selection of the autoclave material of construction was based on the composition of the wastewater feed material. The autoclaves selected for use, each have total capacities of 500 or 750 ml.

The autoclaves were charged with wastewater and sufficient compressed air to provide excess residual oxygen following the oxidation (ca. 5%). The charged autoclaves were placed in a heater/shaker mechanism, heated to the desired temperature (about 260° C. to about 300° C.) and held at temperature for the desired time, ranging from about 60 minutes to about 360 minutes.

During the heating and reacting periods, the autoclave temperature and pressure were monitored by a computer controlled data acquisition system. Immediately following oxidation, the autoclaves were removed from the heater/shaker mechanism and cooled to room temperature using tap water. After cooling, the pressure and volume of the off gas in the autoclave head-space were measured. A sample of the off-gas was analyzed for permanent gases. Subsequent to the analysis of the off gas, the autoclave was depressurized and opened. The oxidized effluent was removed from the autoclave and placed into a storage container. A portion of the effluent was submitted for analysis and the remaining sample was used for post-oxidative treatment. In order to generate sufficient volume for analytical work and post-oxidation test work, multiple autoclave tests for each condition were run.

TABLE I

| | Dry Basis | |
|---|---|---|
| Ag | mg/kg | 1.9 |
| Al | mg/kg | 6,398 |
| As | mg/kg | 159 |
| Ba | mg/kg | 23 |
| Be | mg/kg | 13.0 |
| Ca | mg/kg | 3000 |
| Cd | mg/kg | 2 |
| Co | mg/kg | 59 |
| Cr | mg/kg | 179 |
| Cu | mg/kg | 300 |
| Fe | mg/kg | 11,830 |
| Hg | mg/kg | 0.155 |
| K | mg/kg | 323 |
| Mg | mg/kg | 6500 |
| Mn | mg/kg | 300 |
| Mo | mg/kg | 4875 |
| Na | mg/kg | 2388 |
| Ni | mg/kg | 32,500 |
| Pb | mg/kg | 30.0 |
| Sb | mg/kg | 173 |
| Se | mg/kg | <5.8 |
| Si | mg/kg | 11,925 |
| Sr | mg/kg | 1000 |
| Ti | mg/kg | 305 |
| V | mg/kg | 87,750 |
| Zn | mg/kg | 325 |
| Zr | mg/kg | 323 |
| Total P | mg/kg | 3250.0 |
| SO4 | mg/kg | 5930 |
| Cl | mg/kg | <0.29 |

The design soot cakes were mixed with water to form a design soot slurry having about 3 weight percent solids. The slurry was wet oxidized in an autoclave under various processing conditions, and the percent volatile solids destruction was measured and reported.

Example I

The 3 weight percent design soot slurry was wet oxidized at various temperatures and residence times noted in Table II.

TABLE II

| | Units | Reported As | Effluent A | Effluent B | Effluent C | Effluent D | Effluent E |
|---|---|---|---|---|---|---|---|
| Oxidation Temperature | ° C. | — | 260 | 280 | 295 | 260 | 260 |
| Retention Time | min | — | 15 | 15 | 15 | 30 | 30 |
| Volatile Solids Destruction | % | solids | 68.5 | 84.9 | 89.4 | 85.4 | 79.9 |

The function and advantages of these and other embodiments of the present invention will be more fully understood from the following examples. These examples are intended to be illustrative in nature and are not considered to be limiting the scope of the invention.

EXAMPLES

Raw soot cakes produced by gasification of various bitumens were analyzed for mineral and metal content. The mineral and metal contents of the raw soot cakes were adjusted to produce a design soot cake having a uniform dry composition as illustrated in Table I.

Wet oxidation performed at 260° C. for 15 minutes resulted a volatile solids destruction of 68.5% in run A, while increasing the residence time from 15 minutes to 30 minutes increased the volatile solids destruction to 85.4% and 79.9% as seen in runs D and E. Maintaining a retention time of 15 minutes, increasing the wet oxidation temperature to 280° C. increased the volatile solids destruction to 84.9%, and further increasing the wet oxidation temperature to 294° C. increased the volatile solids destruction to 89.4%.

Example II

The 3% design soot slurry was wet oxidized under various conditions in runs H, I, and J. As a comparison, slurry prepared from raw soot cake without make up to achieve the design composition of Table I was also oxidized at various conditions.

TABLE III

| Run | Reactor Top Temp (° C.) | Reactor Pressure (psig) | Feed Solids (%) | Metals Addition Design | Oxidized Liquor pH | Residence Time (min) | Off Gas Oxygen (%) | Off Gas Oxygen Pressure (psia) | VSS Red'n (%) | COD Red'n (%) |
|---|---|---|---|---|---|---|---|---|---|---|
| F | 260 | 1500 | 2.5 | No | 3.7 | 120 | 7.5 | 62.5 | 27.5 | 31.7 |
| G | 281 | 1811 | 2.2 | No | 3.5 | 142 | 11.7 | 102.4 | 84.2 | 87.1 |
| H | 260 | 1200 | 3.4 | Yes | 3.0 | 60 | 10.0 | 53.4 | 25.9 | 32.2 |
| I | 270 | 1500 | 3.4 | Yes | 2.8 | 60 | 10.0 | 71.6 | 68.8 | 72.7 |
| J | 284 | 1776 | 3.0 | Yes | 2.7 | 62 | 7.4 | 60.0 | 93.9 | 95.6 |

As seen in run H, wet oxidation at 260° C. for 60 minutes resulted in a destruction of 25.9% of the suspended volatile solids. In comparison, increasing the wet oxidation temperature to 270° C. for 60 minutes increased the destruction of suspended volatile solids to 68.8%. Similarly, increasing the wet oxidation temperature to 284° C. for 62 minutes increased the destruction of suspended volatile solids to 93.9%. There was also an increase in the reduction in COD from 32.2% at 260° C. to 72.7% at 270° C. and to 95.6% at 284° C. Again, an increase in wet oxidation temperature increases the reduction in suspended volatile solids.

This increase in destruction efficiency was also noted in runs F and G, which were run with a 3% slurry of the raw soot cake. In runs F and G for which temperatures and residence times increased from 260° C. at 120 min. to 281° C. at 142 min. resulted in an increase in suspended volatile solids destruction from 27.5% to 84.2%, respectively, and an increase in the reduction in COD from 31.7% to 87.1%, respectively.

Example III

The 3% design soot slurry was wet oxidized at 280° C. for 15 min. under various pH conditions in runs K, L, and M as noted in Table IV. The pH of the system was adjusted by the addition of sodium hydroxide.

TABLE IV

| Charge Parameters | Units | Reported As | Effluent K | Effluent L | Effluent M |
|---|---|---|---|---|---|
| Oxidation Temperature | ° C. | — | 280 | 280 | 280 |
| Retention Time | min | — | 15 | 15 | 15 |
| NaOH added | g/L | — | 0 | 1.0 | 140 |
| Analysis |  |  |  |  |  |
| Volatile Solids Destruction | % | solids | 89.3 | 92.8 | 98.7 |
| Soluble V | mg/l | V | 177 | 1470 | 3310 |
| pH | — | — | 2.57 | 4.13 | 9.1 |

As seen in Table IV, at a pH of 2.57, the soluble vanadium was 177 mg/l producing a volatile solids destruction of 89.3%. When the pH was increased to 4.13, the soluble vanadium increased to 1,470 mg/l which resulted in a volatile solids destruction of 92.8%, and when the pH was increased to 9.1, the soluble vanadium was 3,310 mg/l which resulted in a volatile solids destruction of 92.8%. The increase in soluble vanadium as a catalyst increased the volatile solids destruction.

Example IV

The 3% soot slurry was prepared as above for run N. In runs O and P, a portion of the oxidized soot slurry filtrate was recirculated as makeup water for the 3% soot slurry. In run N, the designed soot cake was mixed with 100% water to form a 3% soot slurry. In run O, the designed soot cake was mixed with 85% water had 15% oxidized soot slurry filtrate, and in run P, the designed soot cake was mixed with 70% water and 30% oxidized soot slurry filtrate.

TABLE V

| Run | Reactor Top Temp (° C.) | Reactor Pressure (psig) | Feed Solids (%) | Oxidized Liquor pH | Residence Time (min) | Off Gas Oxygen (%) | Off Gas Oxygen Pressure (psia) | Water for Slurry Mixing | VSS Red'n (%) | COD Red'n (%) |
|---|---|---|---|---|---|---|---|---|---|---|
| N | 284 | 1776 | 3.0 | 2.7 | 62 | 7.4 | 60.0 | 100% water | 93.9 | 95.6 |
| O | 283 | 1799 | 3.0 | 2.3 | 56 | 7.3 | 62.0 | 85% water 15% oxid liq fil | 92.1 | 93.8 |
| P | 281 | 1799 | 3.1 | 2.3 | 57 | 7.6 | 65.6 | 70% water 30% oxid liq fil | 91.8 | 93.8 |

As seen from Table V, the use of oxidized soot slurry filtrate resulted in an insubstantial change in the percent reduction of volatile solids and COD. Specifically, the reduction of volatile solids dropped slightly from 93.9% to 92.15 and 91.8% when the amount of oxidized soot filtrate was increased from 15% to 30%. Likewise, the reduction of COD dropped slightly from 95.6% to 93.8% and remained at 93.8% when the amount of oxidized soot filtrate was increased from 15% to 30%. This slight reduction in efficiency indicated that filtrate recirculation would be effective in reducing water consumption.

Example V

The 3% design soot slurry was wet oxidized for 120 minutes at 260° C. with and without the addition of 0.2 g of nitric acid per gram of carbon, while holding all other wet oxidation conditions constant. Without the addition of the nitric acid, the volatile solids destruction was 76.4%, but increased to 96% with the addition of nitric acid. The presence of oxidation rate enhancers may be beneficial in reducing the process conditions of the wet oxidation unit.

Example VI

Raw slurry prepared from the design filter cake exhibited poor settling and filtering characteristics, in which very little to no settling occurred over an extended period of time. In contrast, the oxidized soot effluent from the wet oxidation process showed very good settling characteristics, in that the interface subsided quickly with an initial settling velocity of 4.8 ft/hr. The supernatant of the oxidized soot effluent was very clear and was estimated to contain less than about 20 mg/l of suspended solids. After 72 hours of settling, the suspended solids concentration of the solids layer of the oxidized soot effluent was 21.2 g/l. These settling and filtering characteristics may allow the oxidized soot to be concentrated to about 25 weight percent to about 30 weight percent, which is significantly higher than the concentration of raw soot slurry with a maximum solids content of about 15 weight percent. The increased concentration of solids in the oxidized soot may therefore reduce disposal and/or metal reclamation costs.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

This invention is not limited in its application to the details of construction and the arrangement of components set forth in the following description or illustrated in the drawings. The invention is capable of other embodiments and of being practiced or of being carried out in various ways beyond those exemplarily presented herein.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims.

Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for the use of the ordinal term) to distinguish the claim elements.

Those skilled in the art should appreciate that the parameters and/or configurations will depend on the specific application in which the systems and techniques of the invention are used. Those skilled in the art should also recognize, or be able to ascertain, using no more than routine experimentation, equivalents to the specific embodiment of the invention. It is therefore to be understood that the embodiments described herein are presented by way of example only and that, within the scope of the appended claims and equivalents thereto, the invention may be practiced otherwise than as specifically described.

What is claimed is:

1. A process for the destruction of volatile organic carbon present in a slurry comprising:
   degasifying a combustion fuel comprising a transition metal to generate a slurry comprising volatile organic carbon and the transition metal;
   detecting the pH of the slurry comprising volatile organic carbon and the transition metal;
   solubilizing at least a portion of the transition metal in the slurry to generate a homogeneous catalyst;
   oxidizing the slurry at a subcritical temperature and a superatmospheric pressure in the presence of the homogeneous catalyst to produce an effluent having a reduced volatile organic carbon content; and
   maintaining the pH level of the slurry at a predetermined level to maintain solubility of the transition metal.

2. The process of claim 1, wherein the slurry comprises soot.

3. The process of claim 2, further comprising recovering one or more transition metals from the effluent.

4. The process of claim 3, wherein recovering one or more transition metals comprises recovering at least one of vanadium, nickel, iron, and molybdenum.

5. The process of claim 4, wherein recovering one or more transition metals comprises dewatering the effluent to produce a filter cake.

6. The process of claim 5, wherein dewatering the effluent produces a filter cake having a solids concentration greater than about 15 weight percent.

7. The process of claim 6, wherein dewatering the effluent produces a filter cake having a solids concentration greater than about 25 weight percent.

8. The process of claim 1, wherein solubilizing at least a portion of the transition metal in the slurry comprises adjusting the pH level of the aqueous slurry.

* * * * *